United States Patent [19]
Hiramatsu

[11] Patent Number: 5,353,055
[45] Date of Patent: Oct. 4, 1994

[54] IMAGE PICKUP SYSTEM WITH AN IMAGE PICKUP DEVICE FOR CONTROL

[75] Inventor: Masaru Hiramatsu, Tokyo, Japan

[73] Assignee: NEC Corporation, Tokyo, Japan

[21] Appl. No.: 868,840

[22] Filed: Apr. 16, 1992

[30] Foreign Application Priority Data

Apr. 16, 1991 [JP] Japan .................. 3-82770

[51] Int. Cl.[5] .............................................. H04N 7/18
[52] U.S. Cl. .................... 348/145; 348/50; 348/144
[58] Field of Search .............. 358/109, 108, 113, 88; H04/7/18; 348/50, 144, 145, 164

[56] References Cited

U.S. PATENT DOCUMENTS

| | | | |
|---|---|---|---|
| 4,419,692 | 12/1983 | Modisette et al. | 358/113 |
| 4,613,899 | 9/1986 | Kuwano et al. | 358/88 |
| 4,639,774 | 1/1987 | Fried | 358/109 |
| 4,688,091 | 8/1987 | Kamel | 358/109 |
| 4,866,626 | 9/1989 | Egli | 364/449 |
| 5,166,789 | 11/1992 | Myrick | 358/109 |

FOREIGN PATENT DOCUMENTS 0407199  9/1991  European Pat. Off. ........ H04N 3/09

*Primary Examiner*—Howard W. Britton
*Attorney, Agent, or Firm*—Sughrue, Mion, Zinn, Macpeak & Seas

[57] ABSTRACT

An image pickup system mounted on a craft flying an orbit above an object zone and sequentially picking up the images of unit areas defined by the swath width of the object zone and a distance in the direction of orbit. The system has a main image pickup device and a control image pickup device for picking up the image of an area ahead of the visual field of the main pickup device, i.e., a forward area preceding the unit area. While the craft flies along the orbit, the control image pickup device detects the radiance distribution of the forward area to thereby control, for example, the sensitivity of the main image pickup device. To detect the radiance distribution, a data processing section included in the control pickup device converts data picked up in the forward area to an image to allow the image to be compared with predetermined reference values.

9 Claims, 9 Drawing Sheets

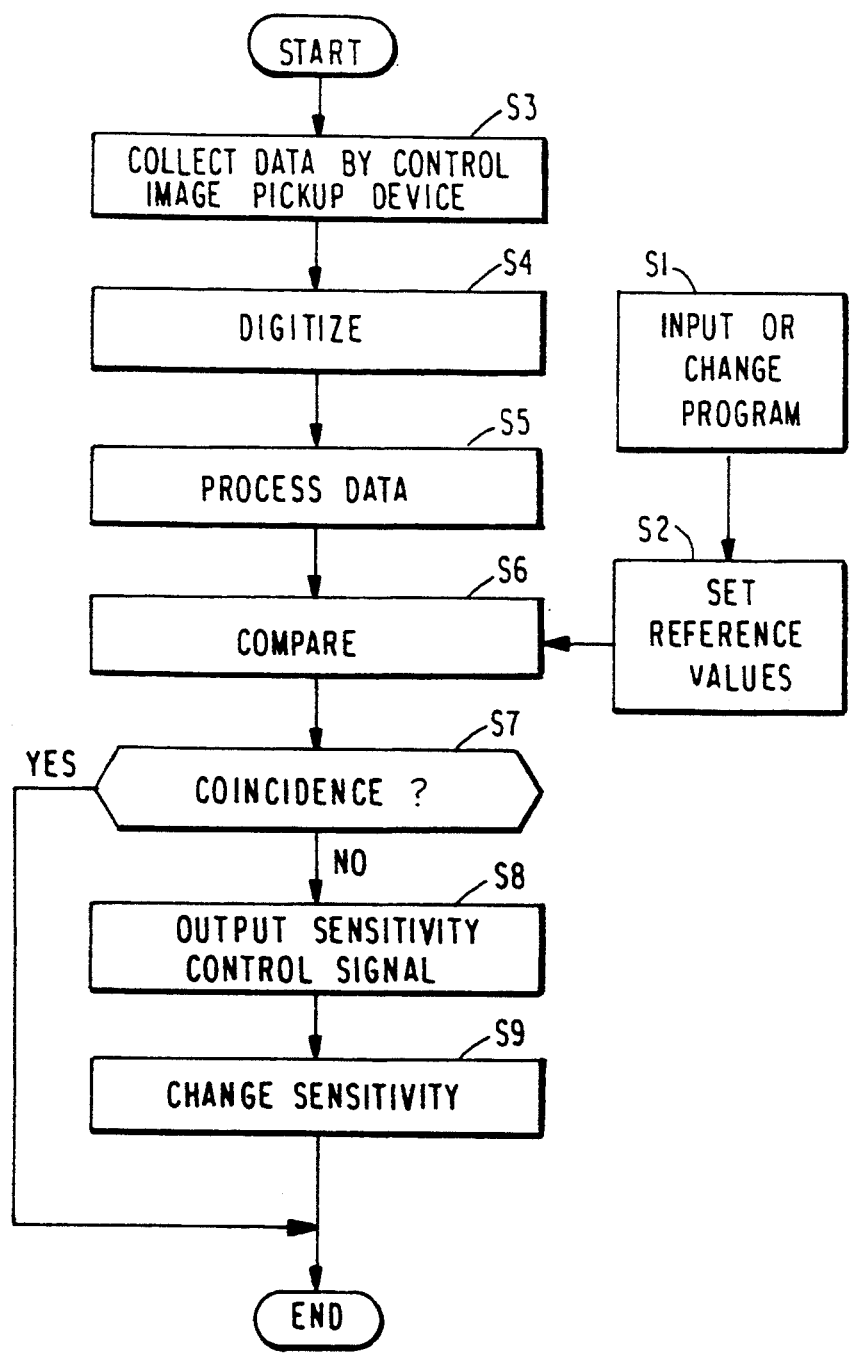

IMAGE PICKUP SYSTEM WITH AN IMAGE PICKUP DEVICE FOR CONTROL

BACKGROUND OF THE INVENTION

The present invention relates to an image pickup system which is to be used in combination with a craft, e.g., a spacecraft or an aircraft flying over the ground surface of the earth or similar object zone.

This type of image pickup device is used to remotely sensing an object zone extending along the flight path of a craft. Typical of such an image pickup device are a multi-spectoral scanner (MSS) and a thmatic mapper (TM) to be mounted on LANDSAT which is one of remote sensing spacecrafts developed by NASA (National Aeronautics and Space Administration).

Another and more recent achievement in the remote sensing art is MESSR (Multi-Spectoral Selfscanning Radiometer) disclosed in a paper "TH DEVELOPMENT OF MULTI-SPECTORAL SELFSCANNING RADIOMETER FOR MOS-1", PROCEEDINGS OF THE FOURTEENTH INTERNATIONAL SYMPOSIUM ON SPACE TECHNOLOGY AND SCIENCE, issued in 1984 in Tokyo, pp. 1313-1319. MESSR is an image pickup system of the above-described type and having a linear CCD (Charge Coupled Device) array as a photoelectric detecting device.

All the image pickup systems introduced in the art sense the intensities of visible rays and infrared rays radiated or reflected from an object zone or target zone on the surface of the earth, i.e., radiances. As well known in the art, a radiation flux P incident to this kind of image pickup system and a radiance N representative of the intensity of, for example, light radiated from the target zone have the following relation:

$$N = P/(\omega S) \quad (1)$$

where $\omega$ is the stereoscopic angle of the visual field of the system, and S is the area of the light-sensitive surface of the optics included in the system. In the equation (1), S is a constant particular to the system and, therefore, the incident radiation flux P is proportional to the radiance N. A detector also included in the system is implemented as a photoelectric tube, CCD array or similar photoelectric elements for converting the flux P incident to the optics to an electric signal A. By measuring the amplitude of the electric signal A, it is possible to determine the radiance N of the target zone. Specifically, assuming that the flat area of the land has a standard radiance of 0 dB, it is generally accepted that the radiance changes by about ±10 dB from a mountaineous region or similar light region where the radiance is high to a marshy region or similar dark region where the radiance is low. The radiance of the sea is known to be about −10 dB. The cloud is extremely light and often exceeds a radiance of ±20 dB. Moreover, the radiance is susceptible to the season, weather, time, and other various conditions. The image pickup system, therefore, should be provided with an adequate sensitivity for observing such radiance data with accuracy. It is a common practice with this type of image pickup system to transmit a great amount of radiation data from the craft to a terrestrial station by using a digital transmission radio data link which has inherently high communication quality. At this instant, assuming that the digitized data has six bits, the valid dynamic range is 36 dB. To set an adequate sensitivity as mentioned above is to insure the linearity of an amplifier and other analog circuit components, i.e., prevent them from being saturated by input signals to thereby promote the collection of maximum and minimum radiance data without distortions, and to set up levels which can be sufficiently confined in the valid dynamic range of digitized data. For example, assuming the above-mentioned radiance data, the maximum dynamic range is achievable if the sensitivity is 0 dB for the sea and −10 dB for the land.

Since a spacecraft capable of mounting the image pickup system surveys substantially the entire surface of the earth with high resolution, it is caused to fly an orbit at a relatively low altitude which is usually referred to as a polar orbit or solar synchronous semirecurrent orbit. Such an orbit may have an altitude of 900 km, an orbit inclination angle of 99°, and an orbital period of 103 minutes by way of example. The period of time of transmission available with the radio data link is limited to the period of time for which the spacecraft is visible. In the specific case described above, the visible period of time, i.e., the transmittable period of time is about 15 minutes per orbit.

It has been customary with image pickup systems, including MSS, TM and MESSR, to manipulate the sensitivity of the system by external control in matching relation to a change in lightness or radiance, e.g., on the transition of target area from the land to the sea. Specifically, all the conventional systems have their sensitivity controlled by a command sent from the land. A terrestrial station, or command and data acquisition station, sets an adequate sensitivity estimated on the basis of positional information on the scheduled orbit of the spacecraft and information indicative of the kind of a region being surveyed, e.g., whether the region is a flat region or a mountaineous region of the land or whether it is the sea. Data representative of the adequate sensitivity is sent to the spacecraft as a common while the spacecraft uses it as a control signal for controlling the image pkckup system.

The conventional image pickup systems cannot adjust sensitivity by themselves and are fixed at a sensitivity set up by externally derived control data, as stated above. This brings about a problem that on the noticeable transition of the subject of survey from the sea to the land or the transition from fine weather to rainy weather, the dynamic range associated with change in radiance is broadened, resulting in the increase in bit length, i.e., in the amount of data to be transmitted in the event of quantization.

On the other hand, when the bit length, i.e., the amount of data to be transmitted is fixed, the effective dynamic range associated with the change in the radiance of a region is reduced. Then, the degree of identification of a region is lowered due to non-linearity, i.e., since saturation and omission occur in a light portion and a dark portion, respectively.

Moreover, to control the sensitivity from the land, it is necessary to estimate the radiance of the area of interest and the duration thereof beforehand. This, coupled with the fact that the control over sensitivity should be completed in the limited transmittable period of time, makes it difficult to execute real-time confirmation and evaluation of the result of control, again resulting in inaccurate and inadequate control.

SUMMARY OF THE INVENTION

It is therefore an object of the present invention to provide an image pickup system having an image pickup device for control capable of detecting a radiance distribution of an area to be picked up beforehand, i.e., having a sensitivity control function in itself.

It is another object of the present invention to provide an image pickup system which has a self-contained image pickup device for control for automatically controlling image pickup conditions to optimal ones at all times and can send accurate data from a spacecraft to a terrestrial station without increasing the amount of data.

It is another object of the present invention to provide an image pickup system which senses the radiance and the duration thereof in an area of interest by a real-time procedure using an image pickup device for control, thereby eliminating the need for the assumption of pickup conditions.

An image pickup system of the present invention includes an image pickup device for control which senses the radiance distribution of a forward area preceding the areas which sequentially enter the visual field of a main image pickup device. The image pickup device for control preferably includes an on-board computer having an image processing capability.

With the above construction, the system of the present invention executes optimal control over the sensitivity and other pickup conditions of the main image pickup device by itself, thereby sending high quality data without increasing the amount of data to be sent from a spacecraft to a terrestrial station.

In addition, the system of the invention frees a terrestrial station from the assumption of pickup conditions by sensing the radiance and the duration thereof in an area of interest on a read time basis, thereby adequately controlling the main image pickup device with accuracy.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIG. 9 is a flowchart representative of a sensitivity changing procedure particular to the embodiment.

DETAILED DESCRIPTION OF THE PREFERRED EMBODIMENTS

Figure 1:
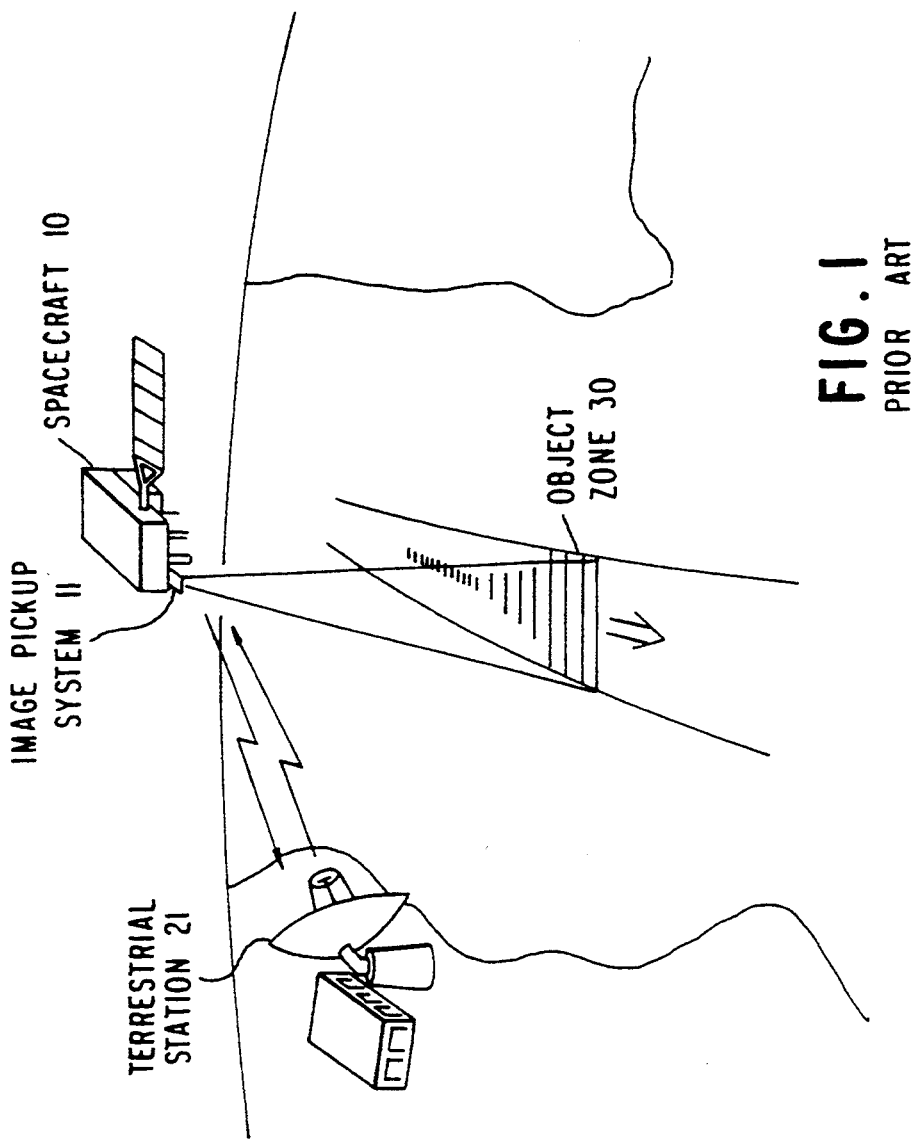
FIG. 1 shows a remote sensing system using a conventional image pickup system.

To better understand the present invention, a brief reference will be made to a prior art image pickup system, shown in FIG. 1. As shown, an image pickup system 11 is mounted on a spacecraft 10 to sense an object zone 30 defined on the surface of the earth and having a swath width of, for example, 100 km, collecting data from the object zone 30. The collected data is processed by a data processing section included in the system 11 and then sent to a terrestrial station 21 via a radio data link transmitter. The terrestrial station 21 estimates an adequate sensitivity of the system on the basis of position information on the scheduled orbit of the spacecraft 10 and information indicative of the kind of the object zone 30, e.g., whether it is a flat area or a mountaineous area on the land or whether it is the sea. The estimated sensitivity data is sent from the terrestrial station 21 to the spacecraft 10 over a radio data link as a command. On receiving the command, the spacecraft 10 uses it as a control signal for controlling the system 11. The spacecraft 10 is assumed to fly an orbit having a relatively low altitude, i.e., 900 km, an orbit inclination angle of 99°, and an orbit period of 103 minutes, as stated earlier.

Figure 2:
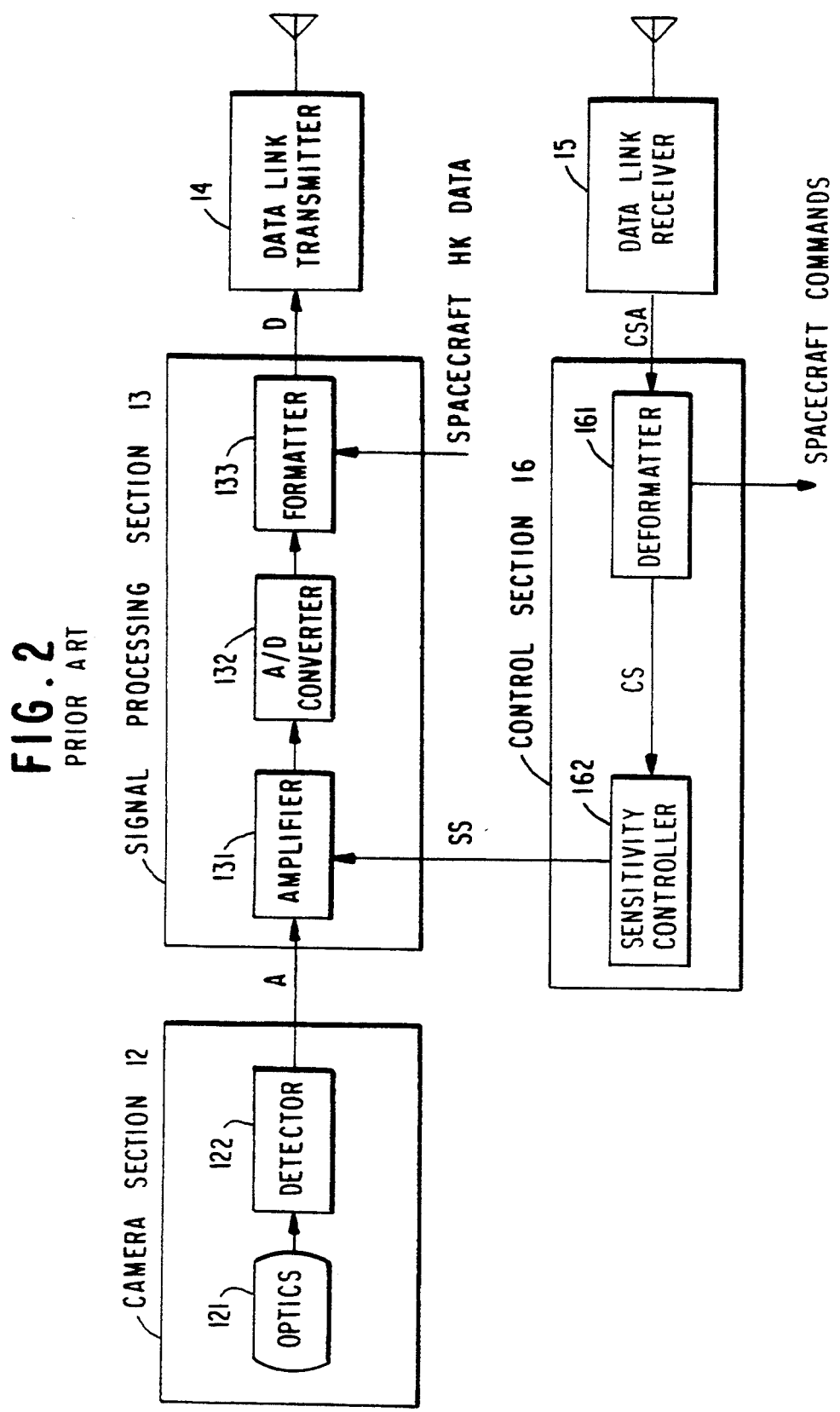
FIG. 2 is a block diagram schematically showing a conventional image pickup system.

Referring to FIG. 2, the image pickup system includes a camera section 12 made up of optics 121 and a detector 122. A signal processing section 13 performs various kinds of processing including analog-to-digital (A/D) conversion with data fed thereto from the camera section 12, thereby providing it with a format suitable for transmission to the terrestrial station 21. A radio data link transmitter 14 sends the processed data to the terrestrial station 21. A data link receiver 15 receives commands from the terrestrial station 21. A controller section 16 controls the camera section 12 and signal processing section 13 according to the command received by the receiver 15. Generally, the detector 122 of the camera section 12 is constituted by, for example, four linear CCD arrays each having 2,000 elements which sufficiently implement resolution for one of a plurality of bands, e.g., 1–4 of the subject of observation. Let the following description concentrate on only one of the four linear CCD arrays for simplicity. Since the object zone 30 has a swath width of 100 kilometers, a resolution attainable with a single 2,000-element CCD array is 50 m. The signal processing section 13 is made up of an amplifier 131, an A/D converter 132, and a formatter 133. The amplifier 131 amplifies the output signal of the camera section 12 and has a gain setting function for changing the sensitivity in three steps, i.e., +10 dB, 0 dB and −10 dB under the control of the controller 16. For this purpose, the amplifier 131 is implemented as, for example, a conventional logical switch circuit capable of selecting particular one of voltage dividing resistors of a resistance-type voltage dividing circuit. The A/D converter 132 digitizes the amplified signal from the amplifier 131 on, for example, a six bits basis. The formatter 133 formats the resulting digital data, e.g., multiplexes the digital data and a telemeter signal which monitors the operating conditions of the spacecraft 10 including the entire system 11, i.e., spacecraft housekeeping (HK) data as well as other signals. The control section 16 has a deformatter 161 and a sensitivity controller 162. The deformatter 161 deformats the commands received from the terrestrial station 21 via the receiver 15 into a control command meant for the signal processing section 13 and commands meant for the entire spacecraft 10. The sensitivity controller 162 controls the gain of the amplifier 131 in response to a sensitivity control command fed from the deformatter 161.

Figure 3:
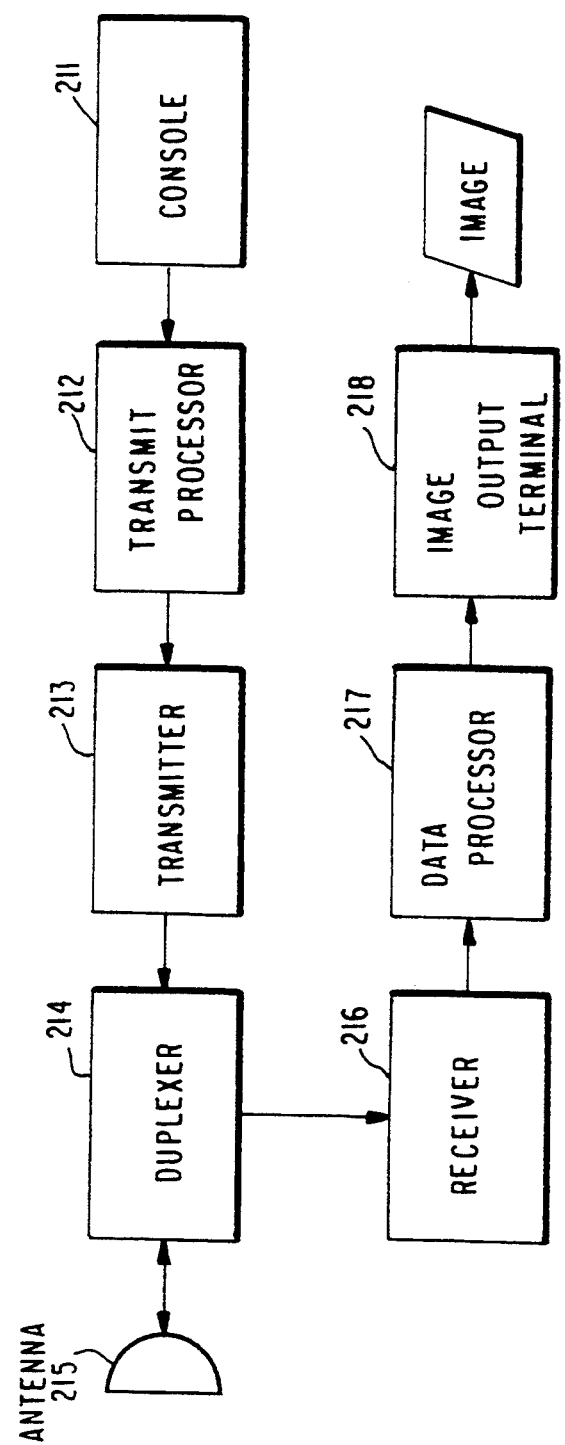
FIG. 3 is a block diagram schematically showing a specific construction of a terrestrial station.

As shown in FIG. 3, the terrestrial station 21 includes a console 211 for setting a sensitivity set command and other control commands. A transmission processor 212 converts the set control commands to signals to be transmitted and delivers the resulting signals to a transmitter 213. A duplexer 214 effects the multiplication and duplexing of the transmission and reception. An antenna 215 sends the control commands to the spacecraft 10 and receives the data from the spacecraft by tracking it. A data processor 217 processes data received via the antenna 215, duplexer 214 and a receiver 216 to output image data. An image output terminal 218 produces an image represented by the image data.

Figure 4:
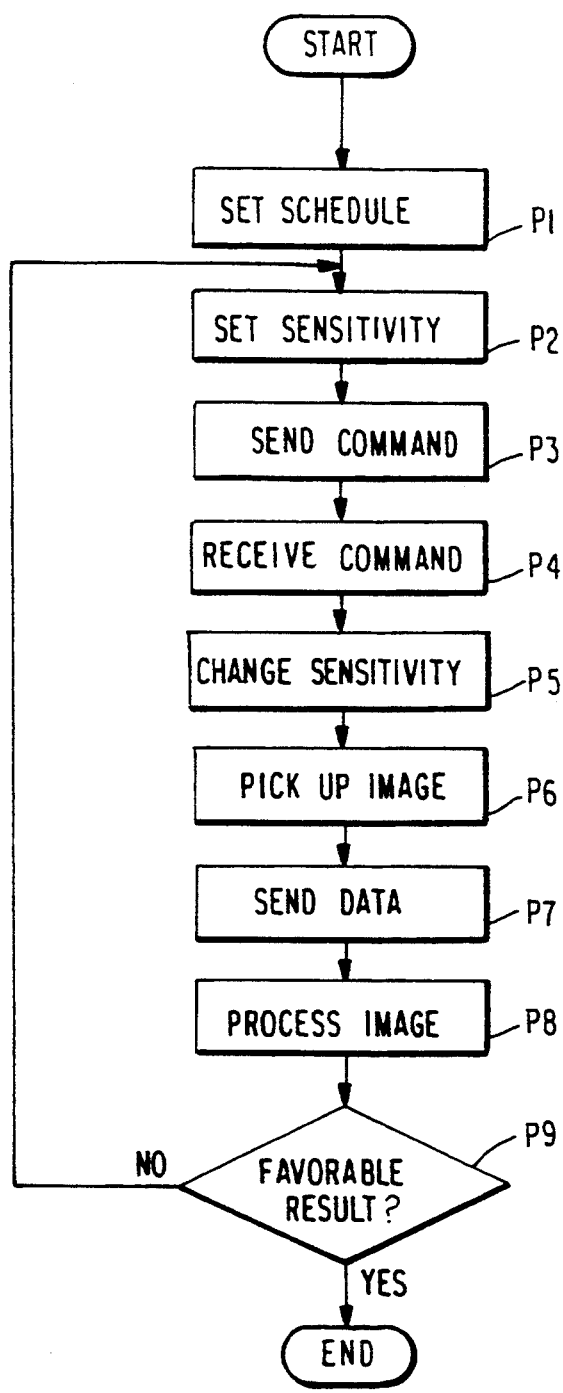
FIG. 4 is a flowchart demonstrating a specific control and signal processing procedure particular to the conventional system.

The operation of the image pickup system 11 will be described with reference also made to FIG. 4. To begin with, at the terrestrial station 21, adequate sensitivity of the system 11 is estimated on the basis of an image pickup schedule associated with the object zone 30 (step P1) and by referencing the position information of the space-craft 10 on the orbit and information indicative of the kind of the zone 30 at the position of interest, e.g., whether it is a mountaineous area of a flat area on the land or whether it is the sea. The estimated sensitivity is set on the console 11 (Step P2). Specifically, one of +10 dB, 0 dB and −10 dB matching the estimated sensitivity is selected by the gain setting function of the amplifier 131. Assume the sensitivity of 0 dB is selected by way of example. The transmission processor 212 combines the sensitivity data, or sensitivity set command CS, with the other control commands meant for the spacecraft 10 and delivers the combined commands to the transmitter 213 as control commands formatted for transmission. The transmitter 213 sends the control commands to the spacecraft 10 via the duplexer 214 and antenna 215 (Step P3). On receiving the control commands, the data link receiver 15 of the spacecraft 10 inputs them as a control signal CSA for the control section 16 (Step P4). In the control section 16, the deformatter 161 separates control commands meant for the signal processing section 13 from the others and delivers, among the separated control commands, the sensitivity set command CS to the sensitivity controller 162. The sensitivity controller 162 decodes the sensitivity set command CS and feeds the decoded command to the amplifier 131 as a sensitivity control signal SS. Then, the amplifier 131 sets up a gain H matching the sensitivity of 0 dB in response to the sensitivity signal SS which specifies 0 dB, as stated above (Step P5). Analog data A from the detector 122 included in the camera section 12 is amplified by the amplifier 131 having set up the sensitivity of 0 dB (Step P6). The amplified output of the amplifier 131 is digitized by the A/D converter 132 to become parallel 6-bit digital data D. The parallel data D are converted to serial data by the formatter 133 and then multiplexed with the previously mentioned telemeter signals representative of the operating conditions of various housekeeping sections, various voltage data, and posture data to be thereby formatted for transmission. The formatted data are sent to the terrestrial station 21 via the data link transmitter 14 (Step P7).

At the terrestrial station 21, the data coming in through the antenna 215, duplexer 214 and data receiver 216 are applied to the data processor 217. The data processor 217 performs predetermined kinds of correction with the received data having suffered from, for example, scanning distortions and the influence of the irregularity in the sensitivity of the detector 122, thereby producing image data. The image output terminal 218 is implemented by, for example, a high-density film recorder and converts the image data to an image (Step P8). The output image is evaluated to see if the radiance of the entire image, the distribution of clouds, the distribution of the objects on the land or the sea and so forth lie in an estimated range and whether or not the image has suffered from nonlinear distortions, i.e., whether or not the image has a light portion thereof saturated or a dark portion thereof omitted (step P9). If the result of evaluation is negative (NO, step 9), e.g., if the image has a light portion thereof saturated, the program returns to the step P2 to reduce the sensitivity. Then, the set command CS is set again on the console 211. In this case, −10 dB is set on the control 211. The reset sensitivity set command CS is sent to the spacecraft 10 via the transmission processor 212, transmitter 213, duplexer 214, and antenna 215. In the step 5, the amplifier 131 is set to a gain L matching the new sensitivity of −10 dB. This is followed by the above-stated sequence of steps P6-P9. If the result of evaluation is positive (YES, step 9), the sensitivity setting procedure ends. It is to be noted that the transmission of control data and the reception of image data are effected within 15 minutes which is the transmittable period of time particular to the radio data link.

Figure 5:
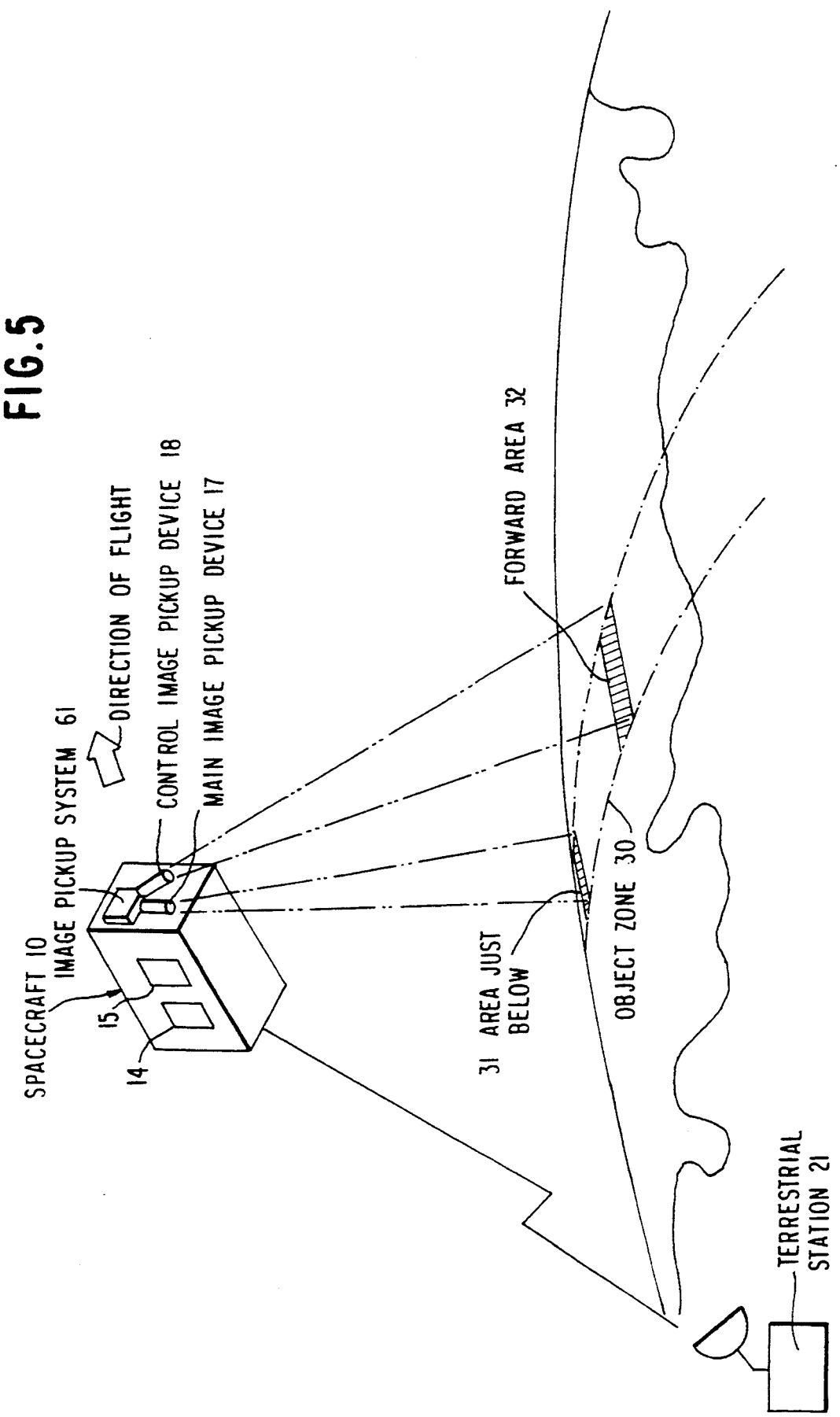
FIG. 5 is a schematic representation of a first embodiment of the image pickup system in accordance with the present invention.

Referring to FIGS. 5-9, an image pickup system embodying the present invention will be described. As shown in FIG. 5, an image pickup system, generally 61, is mounted on a spacecraft 10 and includes a main image pickup device 17 and an image pickup device 18 for control (hereinafter referred to as a control image pickup device 18). The main and control image pickup devices 17 and 18 pick up respectively a partial zone 31 of an object zone 30 immediately below the spacecraft 10 and a partial zone 32 ahead of the spacecraft 10 with respect to the direction of flight of the spacecraft 10. A radio data link transmitter 14 sends image data to a terrestrial station 21. A data link receiver 15 receives commands from the terrestrial station 21. The control image pickup device 18 is so positioned as to pick up an image from an area 25° ahead of the spacecraft 10 by way of example, compared to the main image pickup device 17.

Figure 6:
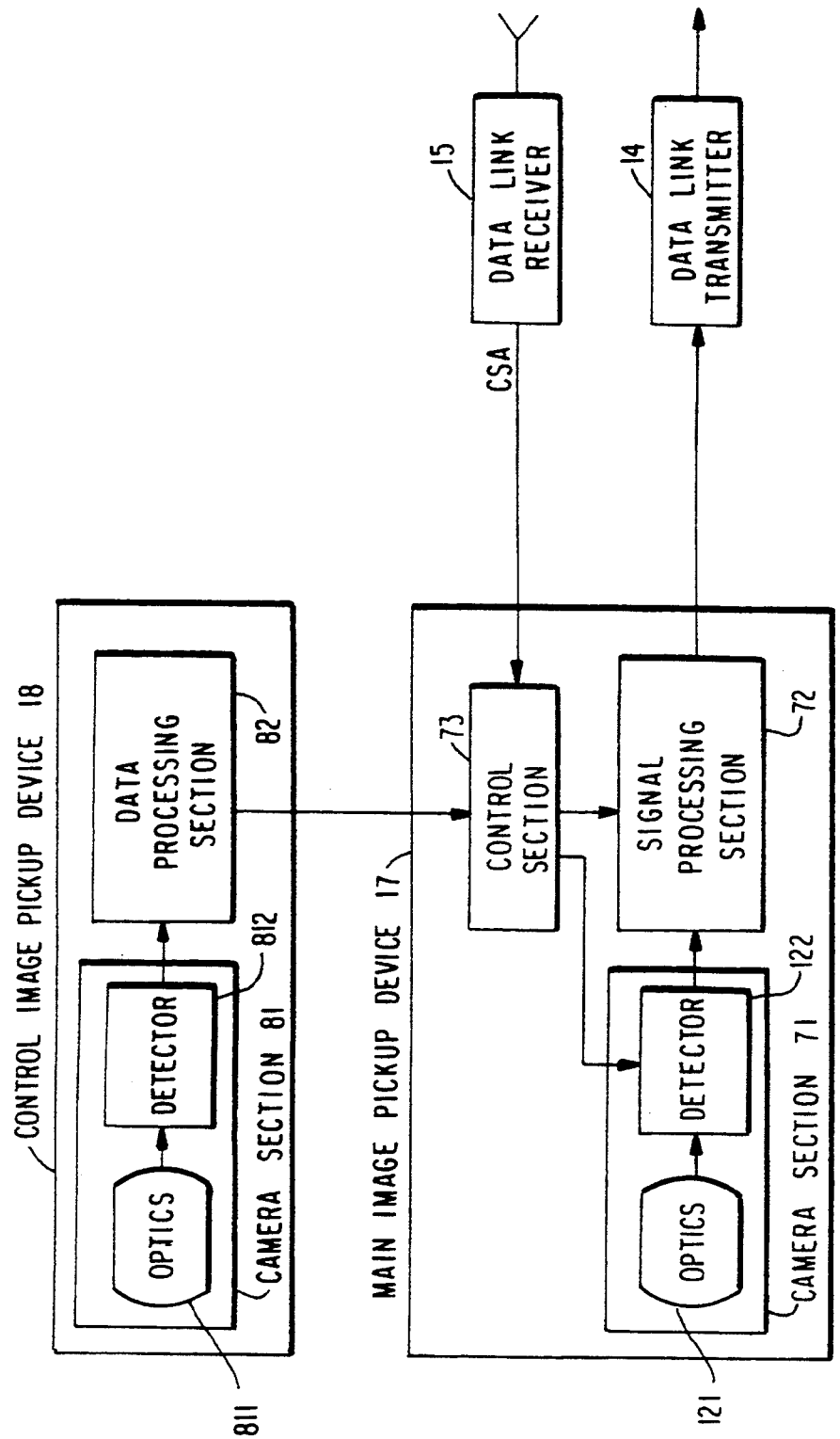
FIG. 6 is a block diagram schematically showing the embodiment.

As shown in FIG. 6, the main image pickup device 17 includes a camera section 71 made up of optics 121 and a detector 122 which are similar to those of conventional system 11. A signal processing section 72 performs A/D conversion and other processing with the data from the camera section 71, so that the data may be sent to the terrestrial station 21. A control section 73 controls the camera section 71 and signal processing section 73 in response to a control signal from the control image pickup device 18 and a control command from the data link receiver 14. Therefore, the swath width is the same as the swath width of the conventional system 11, i.e., 100 km. On the other hand, the control image pickup device 18 has a camera section 81 constituted by optics 811 and a detector 812, and a data processing section 82 for processing data from the camera section 81 to generate a control signal meant for the main image pickup device 17. The detector 122 of the camera section 17 has, for example, four CCD linear arrays each having 2,000 elements and implementing sufficient resolution for respective one of a plurality of bands, e.g., bands 1–4. Again, let the following description concentrate on one of the four CCD linear arrays for simplicity. The resolution is 50 m as in the conventional system.

Since the major function of the control image pickup device 18 is to observe the radiance of a subject of survey, a single observation band representative of radiance is assigned thereto. While the control image pickup device 18, of course, should preferably have the same resolution as the main image pickup device 17, such a resolution is not attainable unless the camera section 81 of the former has the same scale as that of the latter and, in addition, without scaling up the data processing procedure. However, if the resolution is extremely low, the radiance on the surface of the earth lying in the range of resolution will be averaged to make it difficult to detect the peak level of the radiance in the partial zone 31 immediately below the spacecraft 10. The embodiment, therefore, provides the control image pickup device 18 with a resolution which is one half of the resolution of the main image pickup device 17 as a trade-off therebetween. Further, the embodiment provides the control image pickup device 18 with an about 30% wider swath width to allow it to cover the partial zone 31 with a sufficient margin. Hence, the detector 812 of the camera section 81 is constituted by a single linear CCD array having about 1,300 elements. In this case, the aperture of the optics 811 is about one half of the aperture of the optics 121 included in the main image pickup device 17.

Figure 7:
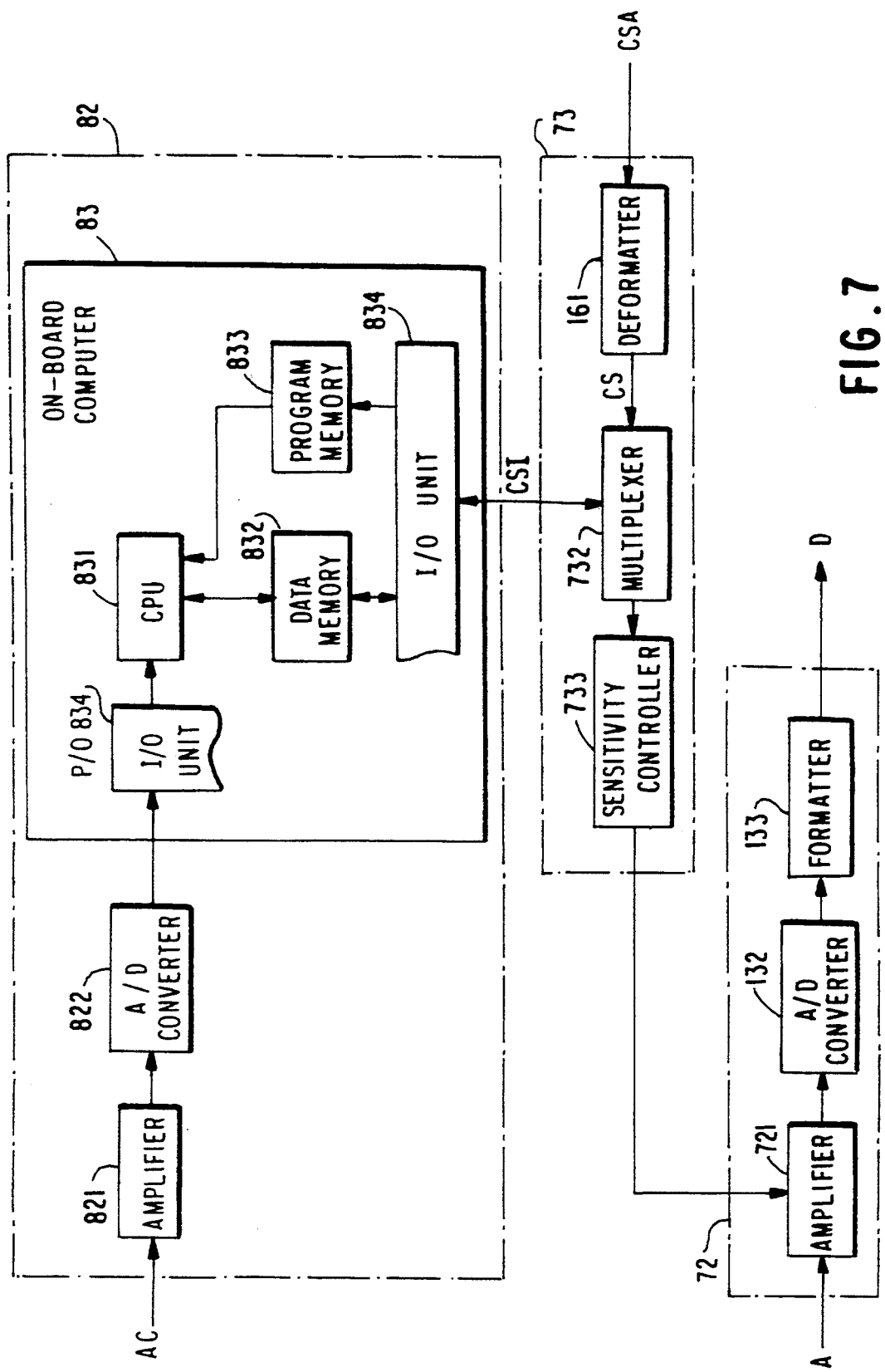
FIG. 7 is a block diagram schematically showing a specific construction of a data processing section and control section included in the embodiment.

Referring to FIG. 7, the signal processing section 72 of the main image pickup device 17 is made up of an amplifier 721 with a gain setting function, an A/D converter 132, and a formatter 133. The amplifier 721 amplifies the output signal of the camera section 71 and adjusts the sensitivity in the range of +12 dB to −12 dB on a 3 dB basis under the control of the control section 73. The amplifier 721 may be implemented by a conventional logical switching circuit capable of switching voltage division resistors constituting a resistance-type voltage dividing circuit. The A/D converter 132 has six bits per amplitude sample, as in the conventional system. The control section 73 is constituted by a deformatter 161 similar to the deformatter of the conventional system, a multiplexer 732 for selecting either a sensitivity set command CS from the deformatter 161 or a sensitivity control signal CSI from the data processing section 82, and a sensitivity controller 733 for controlling the gain of the amplifier 721 in response to the output of the multiplexer 732. The control section 73 controls the camera section 71 and data processing section 72 in response to a command and a control signal fed thereto from the data link receiver 15 and the data processing section 82, respectively. The data processing section 82 of the control image pickup device 18 has an amplifier 821 for amplifying the output signal of the camera section 81, an A/D converter 822 for digitizing the amplified signal from the amplifier 821 at a rate of six bits per amplitude sample, and an on-board computer 83 for processing the output data of the A/D converter 822 to produce a control signal meant for the main image pickup device 17. The on-board computer 83 has a 32-bit CPU (Central Processing Unit) 831, data memory 832, a program memory 833, and an I/O (Input/Output) unit 834 for interfacing the inside and outside of the computer. The CPU 831 has a processing speed of 1MIPS (1M Instructions Per Second). The data memory 832 has a capacity of 15 megabits and stores the output data of the A/D converter 822 and various reference data for data processing. The program memory 833 stores instructions for executing programs. The terrestrial station 21 is identical in construction and operation with the terrestrial station 21 associated with the conventional system.

Figure 8:
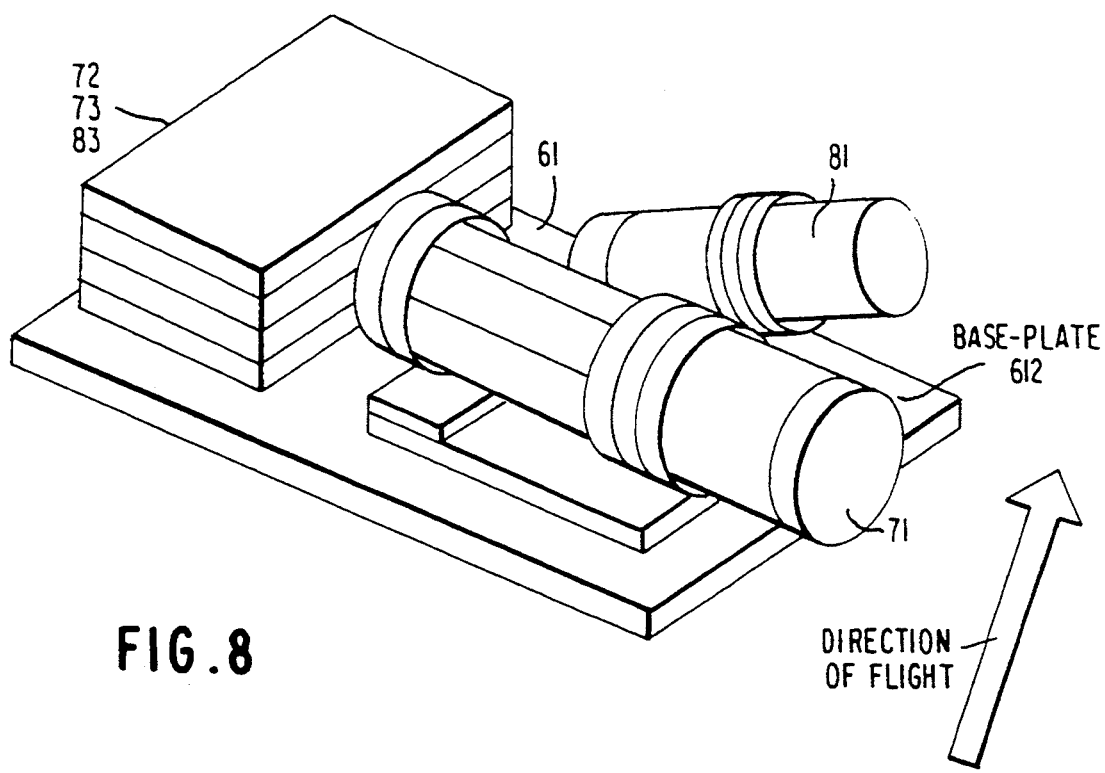
FIG. 8 is an external view showing a specific structure of a main camera section and control camera section also included in the embodiment.

As shown in FIG. 8 specifically, the camera section 71 of the main image pickup device 17 is mounted on a base plate 612 in parallel with the mounting surface of the base plate 612. The camera section 81 of the control image pickup device 18 is mounted on the base plate 612 at an angle of 25° relative to the mounting surface. Also mounted on the base plate 612 are the signal processing section 72, control section 73 and data processing section 82 which are the electronic circuitry included in the main and control image pickup devices 17 and 18. The base plate 612 is affixed to the front end of the housing of the spacecraft 10 such that the aperture of the camera 71 points to the earth, i.e., the partial zone just below the camera 71. As a result, the control image pickup device 18 points to a direction 25° ahead of the direction to which the main device 17 points.

A reference will be made to FIGS. 3, 5–8 and 9 for describing a specific operation of the embodiment. To begin with, a sensitivity control program is input to the program memory 833 of the on-board computer 83 (step S1). The sensitivity control program assumes, for example, 0 dB as an adequate sensitivity SO of the main image pickup device 17 to be set by a level acO of the output AC of the control image pickup device 18 which matches a standard radiance NO of a subject of observation, and changes the sensitivity of the main device 17 in the range of −12 dB to +12 dB every time the output AC of the control image pickup device 18 changes by a step of 3 dB. Further, the control program determines the maximum value NM and minimum value NN of pixel-by-pixel radiance data, sets up the maximum value DM and minimum value DN allowable with regard to the dynamic range of the corresponding image pickup device, and effects the above-mentioned switching operation when the radiance data of a predetermined number of pixels constituting an image of interest exceed the upper limit or the lower limit in such a manner as to compensate for the excess. For example, when, among pixels constituting a given image to be processed, 100 pixels have radiances which are 3 dB higher than the maximum value NM, the control program lowers the gain by 3 dB although such control may be needless as far as the mean value of the entire image of the control image pickup device 18 is concerned. Subsequently, the control program sets up reference values for control and writes them in the data memory 832 (step S2). The reference values are the standard level acO of the output AC of the control image pickup device 18, the maximum value NM, and the minimum value NN. An analog data output AC collected by the control image pickup device 18 (step S3) is amplified by the amplifier 821 of the data processing section 82 and then converted to digital data DC by the A/D converter 822 (step S4). The digital data DC is processed by the CPU 831 and then temporarily written to the data memory 832 as image data ICO (step S5). Assuming a transition from the sea to the land, the level of the analog data AC and, therefore, the average level of the image data ICO sequentially increases. The CPU 831 compares such image data ICO with the above-mentioned reference values (step S6). If the result of comparison (step S7) is NO, meaning that a difference equal greater than ±3 dB is found, the CPU 831 delivers a sensitivity control signal CSI matching the difference to the control section 73 of the main image pickup device 17 via the I/O unit 834 (step S8). In response, the control section 73 causes the sensitivity controller 733 thereof to adjust the gain of the amplifier 721 of the signal processing section 72 to set up a sensitivity designated by the control signal CSI (step S9). If the difference is less than ±3 dB (YES, step S7), the program ends.

By converting the output data of the control image pickup device 18, it is possible to observe the radiance on a pixel basis, i.e., on the basis of the resolution particular to the control image pickup device 18. It follows that the sensitivity can be so set as to confine the maximum and minimum values of the radiance included in the image data in the previously stated dynamic range.

When great part of the area to be surveyed is hidden by the clouds, it is preferable to stop picking up with the main image pickup device 17 since the data obtained from such an area is generally invalid. In this case, the output image of the control image pickup device 18 is extremely light due to the reflection of sunlight from the clouds, i.e., the radiance is extremely high, e.g., higher than +20 dB. Then, a level exceeding the minimum sensitivity is detected. In response, the on-board computer 83 delivers a pickup stop signal CSS to the main image pickup device 17 to thereby prevent the formatter 723 of the signal processing section 72 from outputting data via the multiplexer 732 of the control section 73.

Further, the CPU 831 can determine that the area under survey is the land if the radiance N is NO or that it is the sea if the radiance N is NO −10 dB. In addition, if the radiance N is NO +20 dB, the CPU 831 can determine that the object of interest is the clouds and set up a matching sensitivity.

Regarding the ability of the on-board computer 83, data is input to the computer 83 at a rate of six bits per resolution cell, i.e., per pixel. As the spacecraft 10 flies every 100 m, 1,000 pixels of data are input to the computer 83. Since the orbit velocity of the spacecraft 10 is about 7 km per second, the data rate is 70×1000×6=420000 bits (0.42 megabits) per second. Assuming that one image frame covers a range of 100 km square, i.e., 1000×1000 pixels, it is represented by 6000000 bits (6 megabits) of data. To collect such data, about 7 seconds is needed due to the above-mentioned factors.

On the other hand, the control image pickup device 18 points to a direction 25° ahead. Hence, assuming that the land surface is flat, the image pickup device 18 is shooting an area ahead of the area just below the spacecraft 10 by a distance of about 420 km, i.e., 900 km (orbit altitude × tan 25°). More specifically, the visual field of the control image pickup device 18 precedes that of the main image pickup device 17 by about 60 seconds. Therefore, the computer 83 needs only to convert the data picked up for control to an image, compare the image with the reference values, and effect necessary control within remaining 53 seconds after the collection of data. Among such sequence of steps, the conversion of the data picked up to an image occupies major part of the processing period of time and may be completed within 50 seconds. Rearrangement of data constitutes major part of image processing, and multiplication and addition are only of several times order, compared to all of the data including the multiplication of constants. Therefore, regarding the number of instructions to be executed by the CPU 831, it will suffice that six megabits of data constituting one frame are uniformly accessed, for example, five consecutive times, i.e., 30 megabits are accessed by 32 bits. Hence, the total number of instruction necessary for image processing is 937,500. This means that a CPU having a processing rate of 1MIPS or so can complete the image processing within 1 second.

The data memory 832 has a capacity of 15 megabits, as stated earlier. This is because the data memory 832 needs to store at least two frames of data, i.e., reference data and collected data for control, so that a capacity greater than 12 megabits suffices.

Figure 10:
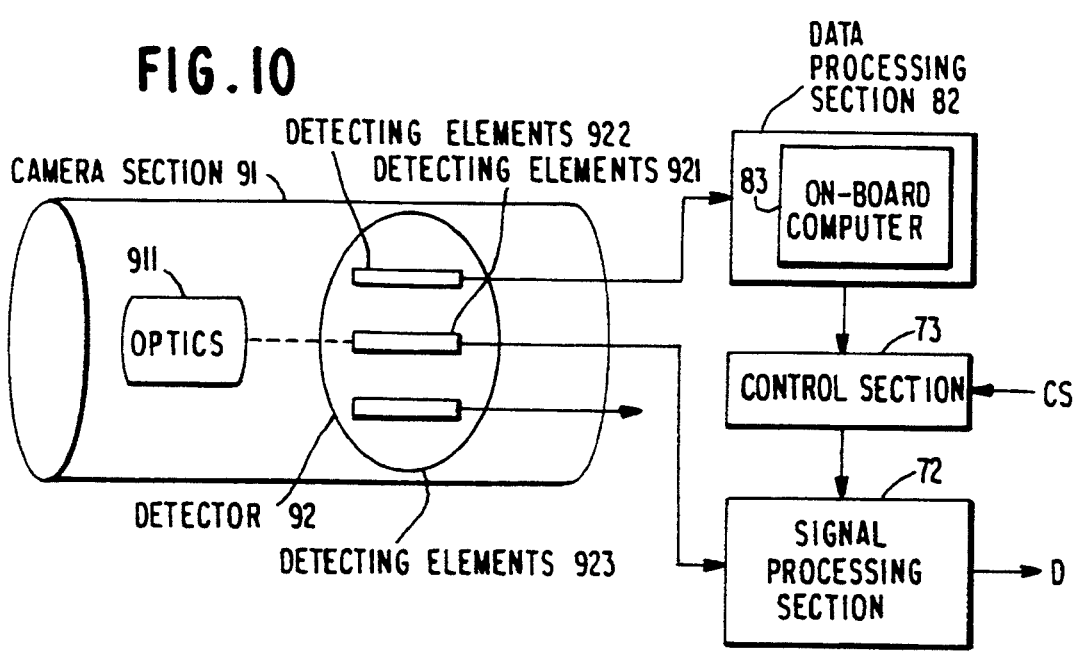
FIG. 10 is a block diagram schematically showing an alternative embodiment of the present invention.

FIG. 10 shows an alternative embodiment of the present invention. As shown, the image pickup system, generally 19, has a single camera section 91 as distinguished from the two cameras 71 and 81 of the previous embodiment. The single camera section 91 has optics 911 and a detector 92. The optics 911 is commonly used for main pickup, control and stereoscopy purposes. The detector 92 is made up of three groups of elements 921, 922 and 923 assigned to main pickup, forward pickup, and rearward view. The data processing section 82 includes the on-board computer 83, as in the previous embodiment. The signal processing section 72 processes the output signal of the elements 921 for main pickup. The control section 73 controls the signal processing section 72 in response to a control signal from the data processing section 82.

In the illustrative embodiment, the image pickup system 19 has an image pickup line for control implemented by a forward image pickup line included in a stereo image pickup system disclosed in U.S. Pat. No. 4,613,899. Specifically, the embodiment uses the optics 911 for three different purposes, as shown in FIG. 4 of the above reference, and arranges three different groups of elements in the detector 92, the group of elements associated with the main pickup line being positioned at the center.

The operation of the image pickup system 19 is as follows. Since the optics 911 of the camera section 91 is shared by the main pickup line, control line and stereoscopy line, the pointing direction of the forward view has to be smaller than that of the previous embodiment and is selected to be 5°, for example. Provided the other parameters are the same as in the previous embodiment, the pickup line for control picks up an image from an area about 80 km ahead of the area just below the spacecraft. Therefore, about 11.4 seconds is available for processing. Since 7 seconds is allocated to image pickup, the on-board computer 83 has to complete processing within remaining 4.5 seconds. This can be done since the CPU 831 of the on-board computer 83 has a processing rate of 1MIPS, as previously stated. The embodiment is practicable without scaling up the optics or the signal processing section due to the shared use of the image pickup device for control. While the optics 911 is shared by the main image pickup line, stereoscopy line and control line, independent optics may, of course, be assigned to each of such lines.

Although the invention has been described with reference to specific embodiments, this description is not meant to be construed in a limiting sense. Various modifications of the disclosed embodiments, as well as other embodiments of the invention, will become apparent with reference to the description of the invention. It is therefore contemplated that the appended claims will cover any modifications as fall within the true scope of the invention. For example, while the embodiments are constructed to control sensitivity, they may alternatively be constructed to change the band, resolution and monochrome/color mode if the program of the onboard computer is so modified.

I claim:

1. An image pickup system mounted on a craft which is located above an object zone and flies along an orbit having a predetermined positional relation with said object zone, said system comprising:
   a main image pickup device for sequentially picking up the images of unit areas defined by a predetermined swath width of said object zone and a distance in the direction of flight of said craft; and
   a control image pickup device for detecting a radiance distribution of a forward area preceding said unit areas which sequentially enter the visual field of said main image pickup device due to the flight of the craft, before the unit area of interest enters said visual field; and
   wherein said control image pickup device comprises:
   means for comparing predetermined reference values defining a radiance distribution associated with said unit areas and a detected value of radiance distribution of said forward area; and
   a data processing section for controlling said main image pickup device in response the result of comparison.

2. A system as claimed in claim 1, wherein said data processing section comprises an image processing unit for converting, before said main image pickup device starts picking up one of said unit areas, the output data of a detector included in said control image pickup device which is associated with said forward having at least the same range as said unit area to one frame of image.

3. A system as claimed in claim 1, wherein said control image pickup device and said main image pickup device share single optics having the unit and the forward area in the same visual field, and the focal plane of said single optics containing a substantially central detector included in said main image pickup device and to which the unit area is focussed, and a detector included in said control image pickup device located in a forward area focusing portion to which the forward image is focused, said detectors each comprising photoelectric detecting elements.

4. A system as claimed in claim 1, wherein said data processing section controls the sensitivity of said main image pickup device.

5. A system as claimed in claim 4, wherein said data processing section comprises:
   means for setting up, for each of predetermined ones of said unit areas, a first, a second and a third output reference value of said control image pickup device which correspond to a standard radiance, an upper limit, and a lower limit, respectively;
   means for effecting image processing with the radiance data of said forward area to produce a corresponding image;
   means for comparing a means value of the radiances of pixels constituting said image with said first reference value and setting up a first sensitivity on the basis of the result of comparison; and
   means for comparing said radiances of pixels of said image with said second reference value,
   means for lowering said first sensitivity if a predetermined number of pixels exceed said second reference value, and
   means for raising said first sensitivity if a predetermined number of pixels are less than said third reference value.

6. A system as claimed in claim 4, wherein said image processing unit comprises:
   a CPU (Central Processing Unit);
   a memory capable of storing at least said one frame of output data of said detector; and
   a program memory storing a program for controlling the sensitivity.

7. A system as claimed in claim 1, wherein said main image pickup device comprises:
   a first camera section comprising first optics having the unit area in the visual field thereof, and a first detector positioned in a first focal plane of said first optics to which said unit area is focused;
   an amplifier for amplifying the output signal of said first detector and comprising gain control means; and
   a control section for controlling said gain control means of said amplifier in response to a control signal;
   said control image pickup means comprising:
   a second camera section comprising second optics having said forward area in the visual field thereof, and a second detector positioned on a second focal plane of said second optics to which said forward area is focused; and
   a data processing section for processing the output signal of said second detector to deliver said control signal to said control section.

8. A system as claimed in claim 7, wherein said first detector comprises first and second photoelectric detecting means assigned to a first and a second observation band, respectively.

9. A system as claimed in claim 8, wherein said first and second photoelectric detecting means each comprises a linear CCD (Charge Coupled Device) array.

* * * * *